United States Patent [19]

Houser, Jr. et al.

[11] Patent Number: 4,513,381
[45] Date of Patent: Apr. 23, 1985

[54] SPEED REGULATOR FOR POWER TOOL

[75] Inventors: John Houser, Jr., Pickens, S.C.; Thomas C. Laughon, Alpharetta, Ga.

[73] Assignee: The Singer Company, Stamford, Conn.

[21] Appl. No.: 385,631

[22] Filed: Jun. 7, 1982

[51] Int. Cl.³ .................. H02P 1/22; H02P 7/28
[52] U.S. Cl. ............... 364/475; 364/188; 364/191; 364/511; 364/174; 364/474; 318/305; 318/345 C; 318/345 D; 318/345 H; 318/571; 318/332; 318/345 E; 340/802; 408/9
[58] Field of Search ............ 318/305, 345 CB, 345 C, 318/345 D, 345 G, 345 H, 571, 332; 364/474, 475, 174, 511, 188, 191; 408/8–12

[56] References Cited

U.S. PATENT DOCUMENTS

| | | |
|---|---|---|
| 3,085,169 | 4/1963 | Abel . |
| 3,224,338 | 12/1965 | Reynolds ............ 318/332 X |
| 3,248,629 | 4/1966 | Reynolds ............ 318/332 X |
| 3,325,710 | 6/1967 | Reynolds ............ 318/332 X |
| 4,052,132 | 10/1977 | Oates . |
| 4,198,180 | 4/1980 | Schultz ............... 408/9 |
| 4,237,408 | 12/1980 | Frecka ............... 318/571 |
| 4,292,571 | 9/1981 | Cuneo ............... 408/9 X |
| 4,307,325 | 12/1981 | Saar ............... 318/472 X |
| 4,317,176 | 2/1982 | Saar et al. . |
| 4,335,847 | 6/1982 | Levine ............ 364/505 X |
| 4,346,444 | 8/1982 | Schneider et al. ............ 364/475 |
| 4,394,606 | 7/1983 | Woerwag ............ 318/332 X |
| 4,408,280 | 10/1983 | Bedini et al. ............ 364/511 X |
| 4,410,846 | 10/1983 | Gerber et al. ............ 364/174 X |
| 4,412,158 | 10/1983 | Jefferson et al. ............ 318/284 X |

FOREIGN PATENT DOCUMENTS 2058405 8/1981 United Kingdom .

OTHER PUBLICATIONS

Hitachi Hammer Drill.

Primary Examiner—Jerry Smith
Assistant Examiner—Allen MacDonald
Attorney, Agent, or Firm—Edward P. Schmidt; Robert E. Smith; Edward L. Bell

[57] ABSTRACT

A power tool in which feed rate information is used as a means of changing cutting implement speed to maintain an optimum chip rate removal. As the tool is loaded by a feed rate increase, the motor speed will increase to that point empirically determine to provide a good finish for the material and cutting implement size selected. If the load decreases, the motor speed will correspondingly decrease to that speed which will provide a good finish for the material and cutting implement size selected with out overheating of the material. A limit would be set to indicate to an operator when he is at the upper limit of the speed and feed rate range and turn off the tool after a short period of time to prevent destructive overheating.

8 Claims, 9 Drawing Figures

ROUTING SPEEDS (RPM) FOR HIGH SPEED STEEL AND CARBIDE BITS

| BIT SIZE: | MATERIAL: | | | |
|---|---|---|---|---|
| | SOFT | MEDIUM | HARD | VERY HARD * |
| 1/4" | 25,000 | 24,000 | 23,000 | 24,000 |
| 3/8" | 24,000 | 23,000 | 18,500 | 23,000 |
| 1/2" | 18,500 | 16,000 | 14,000 | 21,500 |
| 3/4" | 14,000 | 11,000 | 11,000 | 18,500 |

* CARBIDE BITS REQUIRED

SPEED REGULATOR FOR POWER TOOL

DESCRIPTION

Background of the Invention

This invention is in the field of power tools; more particularly, it relates to a control for establishing the required rotational speed of a given size cutter for a selected material; and for correcting speed, based upon loading imposed upon the tool by an operator.

In tools that use a moving cutter or cutting edge, an efficient quality cut requires the establishment of three parameters, provided proper tool usage techniques are followed such as having properly sharpened tools or utilizing cutting lubricants. The three parameters are, speed of the cutting edge, material hardness and relative velocity between the material and the cutter.

In large machine tools, these parameters are taken into account during a setting up operation for the tool. The operator will look up the appropriate cutting speed and material feed in a book of tables supplied by the machine manufacturer, or in a machinist handbook, based upon the type of material to be machined. Generally, as material hardness increases, cutter speed and material feed will decrease. There is a range of volumetric rates of removal for any given material and cutter which results in efficient cutting, with a good finish. If the cutter speed is too fast, and/or the feed rate is too slow, the cutter or material may overheat and over an extended period, dull the cutting edge. If the cutter is too slow and/or the feed rate too fast, the material tends to be removed in chunks or pieces, resulting in a poor finish and applying a shock loading on the power tool which may shorten its life.

Although these principles are well accepted and practiced in the industry, there has been little done in this regard in consumer tools, particularly with respect to hand held or bench power tools. For many years, portable tools such as drills, sabre saws and polishers, and bench tools such as drill press, band saw, arbor saw, jointer-planer, sander, for example, have more or less incorporated speed controls to vary output speed. However, outside of general comments about feeding tools or work smoothly, such as described in user manuals, the judgement about feed rate was left up to the consumer since there was no way of having the tool make this decision.

What is required, is an arrangement for a hand held or bench power tool in which the operator may select the cutting implement size to be used and a material to be operated upon and have the power tool automatically go to and maintain an ideal cutting speed by accommodating the speed of the power tool to a feed rate selected by the operator.

SUMMARY OF THE INVENTION

The above improvements are obtained in a hand held or bench power tool having capability thereon for operator selection of size of cutting implement such as drill bit, end mill or grit for paper, etc., and of material hardness, and an arrangement which responds to selected cutting implement size and material hardness to regulate motor speed to an optimum value determined from a table stored in a memory. The cutting implement may be a cutter bit for a router or a drill bit for a drill or may be grit size for a sander. The arrangement may regulate motor speed to the predetermined optimum value by monitoring slight changes from the optimum speed and adjusting effective motor voltage for speed correction. The effective motor voltage may be varied by varying the firing angle triggering on a triac in series with the motor every half line cycle. The longer that the triac is turned on, the greater the effective motor voltage.

Since the firing angle of the triac is a known quantity, as is the total applied line voltage, the effective voltage can be calculated. By dividing the effective voltage by the effective motor impedance at the optimum operating speed stored in the memory, the effective motor current is calculated. The effective motor current is directly proportional to motor torque or load. As the feed rate changes, the motor load changes, resulting in a corresponding current change which is detected through the triac firing angle change needed to correct for an attempted speed change.

Since the arrangement, which may be a microprocessor or microcomputer, controls the firing angle of the triac, it is also able to determine the feed rate for the tool with data stored in the memory. It is not necessary to go through the calculations, appropriate current-speed relationships empirically determined can be converted into relative triac firing angle data and stored in the memory. Thus, the arrangement may indicate to an operator the status of the present speed rate, or may control the tool so as to adjust the cutter speed for the amount of feed rate applied.

A feed rate indication system can be set up utilizing two vertical rows of LEDs which are visible from the front of the hand held or bench power tool. The left row corresponds to material hardness selection ranging from soft to very hard. The right row indicates typical cutter size parameters. With the hand held or bench power tool connected to a power source, pressing a momentary switch beneath each row advances the position of the lit LED from soft to very hard or from the smallest cutter size indicated to the largest indicated. In this way, appropriate speed selection can be implemented depending on material and cutter size requirements. Feed rate indication may be accommodated by, for example, flashing an underfeed indicator LED when the power tool is insufficiently loaded, indicating an under feed condition, or by flashing an overfeed indication LED whenever the power tool is loaded beyond the rate in which optimum cutting can proceed. By keeping both LEDs continuously lit, or continuously off, the feed rate is indicated as within the preferred limits or range. Alternatively, LEDs may be located within an operator's line of sight when operating the power tool in a normal fashion. The over/under feed rate indication system might be used to train an operator on a scrap piece of material until he has acquired a feel which will permit him to operate the power tool with minimum or no reference to the LEDs while working on the final piece of work material.

In a power tool in which the feed rate information is used as a means of changing cutter speed to correct for feed rate changes, as the tool is loaded by a feed rate increase, the motor speed will increase; or if the load decreases the motor speed would correspondingly decrease. A program limit would be set to indicate to an operator when he is at the upper limit of the speed and feed rate range and possibly shut down the tool if the warning is ignored. A practical approach might be to start out with a slightly low speed which would be changed to a higher, normally regulated speed once a preferred load or feed rate has been achieved. An upper limit control again would be desirable as described. If the load is removed from the tool the speed would, of course, drop to the lower value again.

DESCRIPTION OF THE DRAWINGS

For a better understanding of the invention, reference may be had to the specification and the attached drawings in which.

Figure 1:
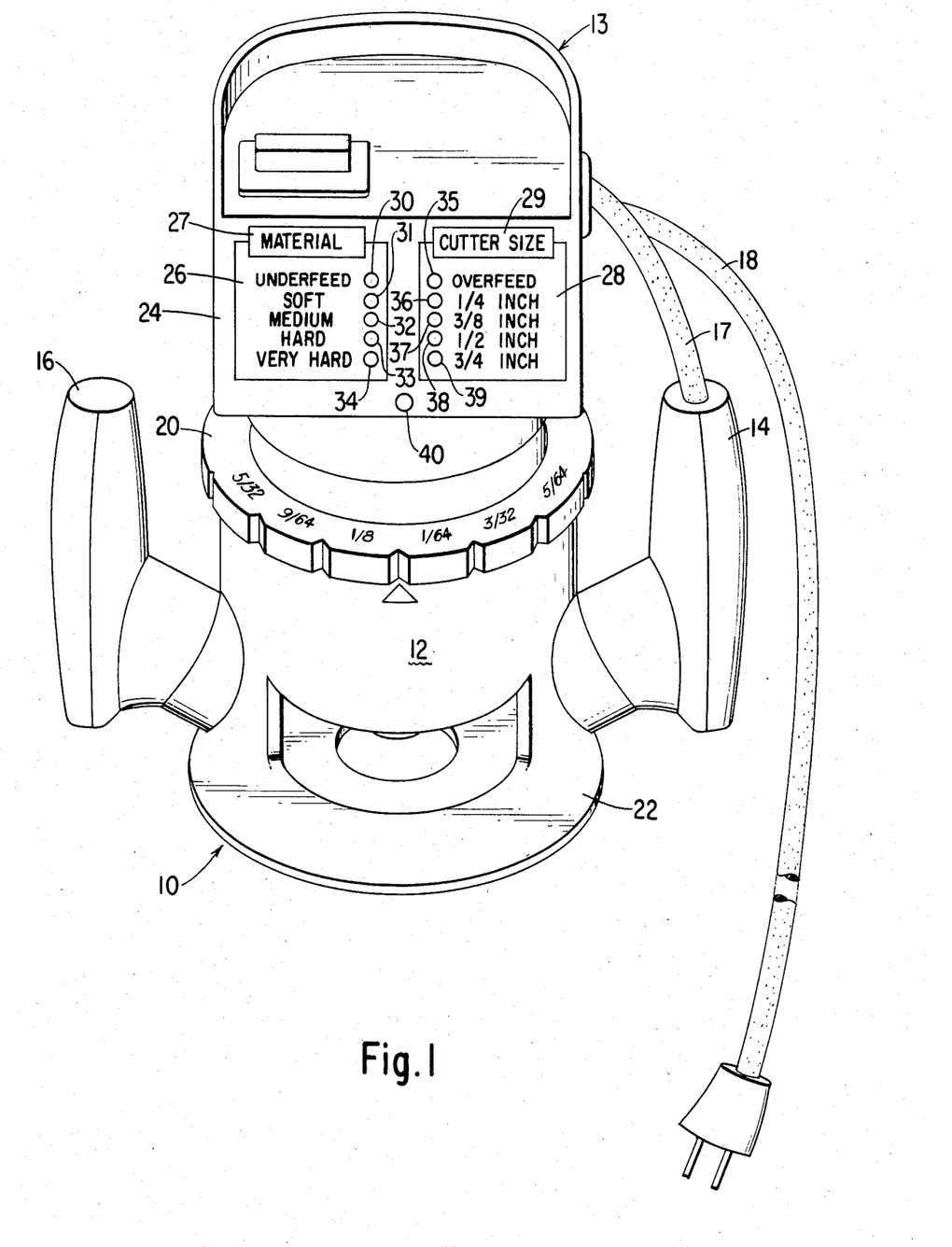
FIG. 1 is a front perspective view of a power tool in which the invention has been incorporated.

Referring now to FIG. 1, a hand held power tool, specifically a router 10 is disclosed. The router 10 is fashioned with substantially cylindrical housing 12 in the upper end of which is supported a driving motor (not shown) which is normally covered by cap 13. Projecting from the housing 12 are right handgrip 14 and left handgrip 16, there being visible extending from the right handgrip a trigger switch lock 15 for a trigger switch (not shown) which is located in the right handgrip. A cord 17 extends from the right handgrip 14 to the cap 13 for the motor (not shown), and line cord 18 extends from a source of power to the cap and to an electronic control which will be described below. Situated approximately midway of the housing 12 is a depth adjustment ring 20 calibrated as shown to provide for extension of a cutter (not shown) beneath the router base 22 for operation of the cutter upon a work material. Situated above the depth adjustment ring 20 is a panel 24 upon which are inscribed a material table 26 and cutter size table 28. The material table 26 includes the columnar tabulation "UNDERFEED", "SOFT", "MEDIUM", "HARD", "VERY HARD"; each adjacent a circle 30 through 34, respectively, which each outlines an LED as will be further explained below. The appellation "SOFT" may apply to white pine; "MEDIUM" to yellow pine, "HARD" to oak or cedar, and "VERY HARD" to composite materials such as particle board. The cutter size table includes a columnar listing "OVERFEED", "¼ INCH", "⅜ INCH", "½ INCH" and "¾ INCH"; each also beside a circle 35 through 39, respectively, which also each outlines LEDs as will be explained below. The material table 26 is headed by a MATERIAL label which is a pushbutton 27 which may be depressed for a purpose which will be further explained below. Likewise, the cutter size table 28 is headed by a CUTTER SIZE label which is a pushbutton 29 for a purpose to be further described below.

Figure 2:
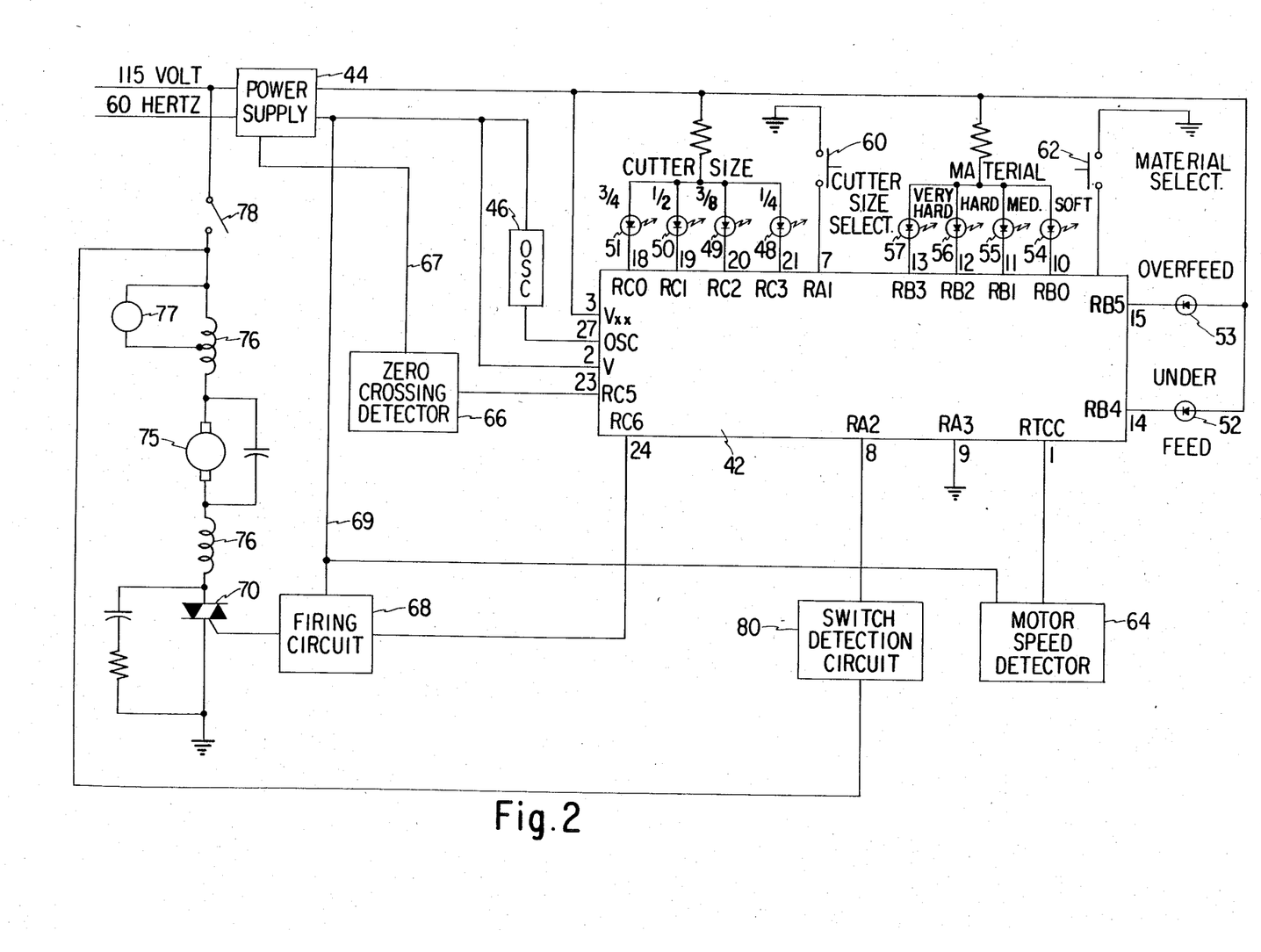
FIG. 2 is a circuit diagram of the material and cutter size selection, overfeed and underfeed control according to the present invention.

Referring now to FIG. 2, there is shown a block diagram for a circuit which may be included within the cap 13 of the router 10, preferably adjacent the panel 24 thereof. The main component in the circuit is a microcomputer 42, which may be implemented by a PIC1655A manufactured by the General Instrument Corporation. A power supply 44 receives power from the 115 volt, 60 hertz mains and provides rectified DC voltage for the microcomputer 42, oscillator 46 motor speed detector 64 and firing circuit 68. DC power is also supplied to LEDs 48 through 51 which are located in the circles 36 through 39, respectively, of FIG. 1; to LEDs 54 through 57 which are located in circles 31 through 34, respectively of FIG. 1; and to LEDs 52 and 53 which are located in circles 30 and 35 of FIG. 1, respectively. Elective scanning from the ¼" cutter size LED 48 to the ¾" cutter size LED 51 is implemented by a cutter size select switch 60 which is actuated by pushbutton 29 in FIG. 1. Repeated actuation of the cutter size select switch 60 implements the scanning action through the microcomputer 42 with the scanning reverting from the ¾" cutter size LED 51 back to the ¼" cutter size LED 48 so that continual scanning of the LEDs are possible by repeated actuation of the cutter size select switch 60. A material select switch 62 actuates through pushbutton 27 of FIG. 1 a similar scanning of the material selection from soft through very hard and return to soft by the microcomputer 42 in the identical fashion to the cutter size selection. Selection may be implemented only when the trigger switch is not depressed, for the sake of safety.

Figure 3:
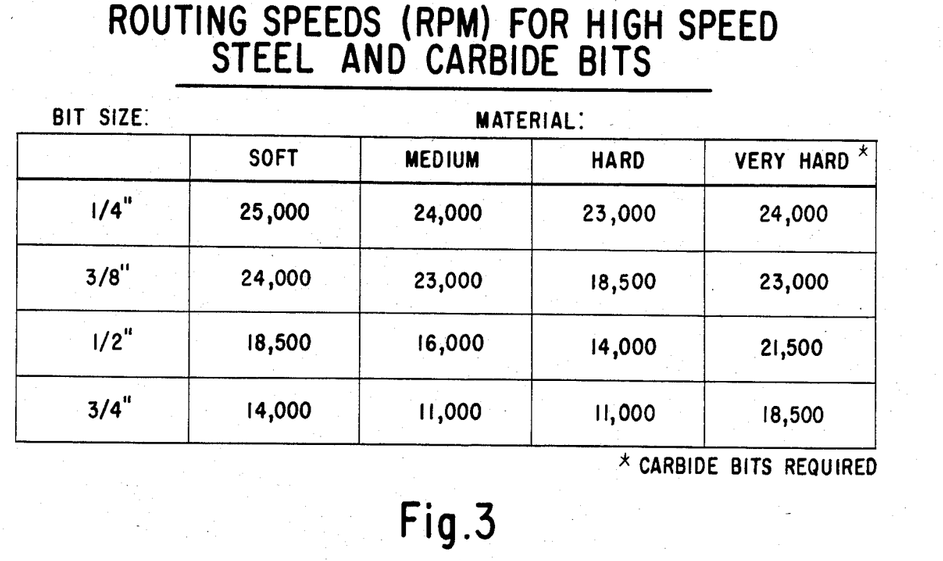
FIG. 3 is a cutter size-material-speed matrix stored in the microcomputer shown in FIG. 2.

Another input to the microcomputer 42 is a motor speed detector 64 which might be implemented by multiple rotating magnets with coil, or by an optical interrupter, used in conjunction with a rotating segment disc or other device for feeding back a motor speed to the electronic control. A preferred method would be to utilize a Hall effect sensor and a multipole magnet. A zero crossing detector 66 receives a signal along line 67 from the low voltage alternating current in the power supply 44 to detect zero crossing and provide this informaion to the microcomputer 42 for determination of phase angle for a firing circuit 68. The firing circuit 68 derives power from the power supply 44 through line 69, and initiates conduction of triac 70 through the gate thereof to provide a ground connection for motor armature 75 and field coils 76 of motor 74. A trigger switch 78 has a single pole to connect the 115 volts, 60 hertz supply to the field coils 76 and motor armature 75. A switch detection circuit 80 detects closing of trigger switch 78 and signals the microcomputer 42 to initiate operation of the firing circuit 68. A lamp 77 located adjacent router base 22 illuminates the work area and is connected across a field coil to a center tap thereof. The microcomputer 42 regulates speed depending on the cutter size selection and material selection selected by means of switches 60, 62, respectively, and according to a speed table shown in FIG. 3 which may be retained in a read only memory (ROM) in the microcomputer. The speed of the armature 75 is detected by the motor speed detector 64, the signal from which is used by the microcomputer 42 to maintain the motor armature at the optimum speed. The motor speed detector 64 also receives power through line 69.

Speed regulation is accomplished by the microcomputer 42 monitoring slight changes in speed from the speed detector 64 and adjusting effective motor voltage for correction. The triac 70 in series with the motor is triggered on every half line cycle. The firing angle (that is the delay time from the start of each half cycle, when the triac 70 is triggered) will determine the effective motor voltage. Since the firing angle of the triac 70 is a known quantity, as is the total applied line voltage, the effective voltage can be calculated. By dividing the effective voltage by the effective motor impedance at the optimum operating speed, information stored in the ROM, the effective motor current is calculated. Motor current is directly proportional to motor torque or load. As the feed rate changes, motor load changes. This results in a corresponding current change and is detected through a change required in the firing angle of the triac 70 to correct for an incipient speed change. The microcomputer 42 controls the firing angle of the triac 70 by means of the firing circuit 68. With the data that the microcomputer has stored in its ROM, the microcomputer is able to determine the optimum feed rate for the tool. The microcomputer 42 may or may not go through the calculations referred to above; however, the appropriate current-speed relationships can be arrived at empirically for typical type of material and cutter size, and tables of firing angles for normal line voltages and given currents may be stored in the ROM. For various materials and cutter sizes, for each combination of which there is an optimum speed, power tables may also be derived empirically and related to firing angle. Thus, the microcomputer 42 has means of either indicating to the operator the relative feed rate; or of controlling motor speed so as to correct for the feed rate being applied.

When the tool is in use, whichever material and cutter size LEDs are lit may also be used as feed rate indicators. For example, the selected material LED will flash whenever the router is insufficiently loaded, indicating an under feed condition, such as when the router is up to speed and little or no cutting is taking place. When cutting proceeds, the material LED will return to its steady on condition as the feed rate moves into a preferred current-speed range. If the feed rate is increased so as to move beyond the upper limit of the desired feed rate range, the cutter size LED will commence flashing. By keeping both LEDs steady, the feed rate is within the preferred range. A preferred method, however, is to have separate LED's 52, 53 which are responsive to underfeed and overfeed, respectively. Separate LED's for underfeed and overfeed would allow their location to be optimized for operator observance while operating on a work piece. Load tables are established empirically and stored in the ROM of microcomputer 42 to just avoid underfeed for each material and cutter size which causes the material to begin to discolor from excess heat, and to just avoid overfeed for each material and cutter size which causes material to be removed in chunks resulting in poor finish. The use of an underfeed indicator will have a beneficial effect on the life of the cutting implement since overheating thereof will be avoided. The overfeed indicator will extend both the life of the power tool and the cutting implement since by responding to an overfeed indication by reducing loading, shock loading to both the cutting implement and the power tool may be avoided.

Figure 4A:
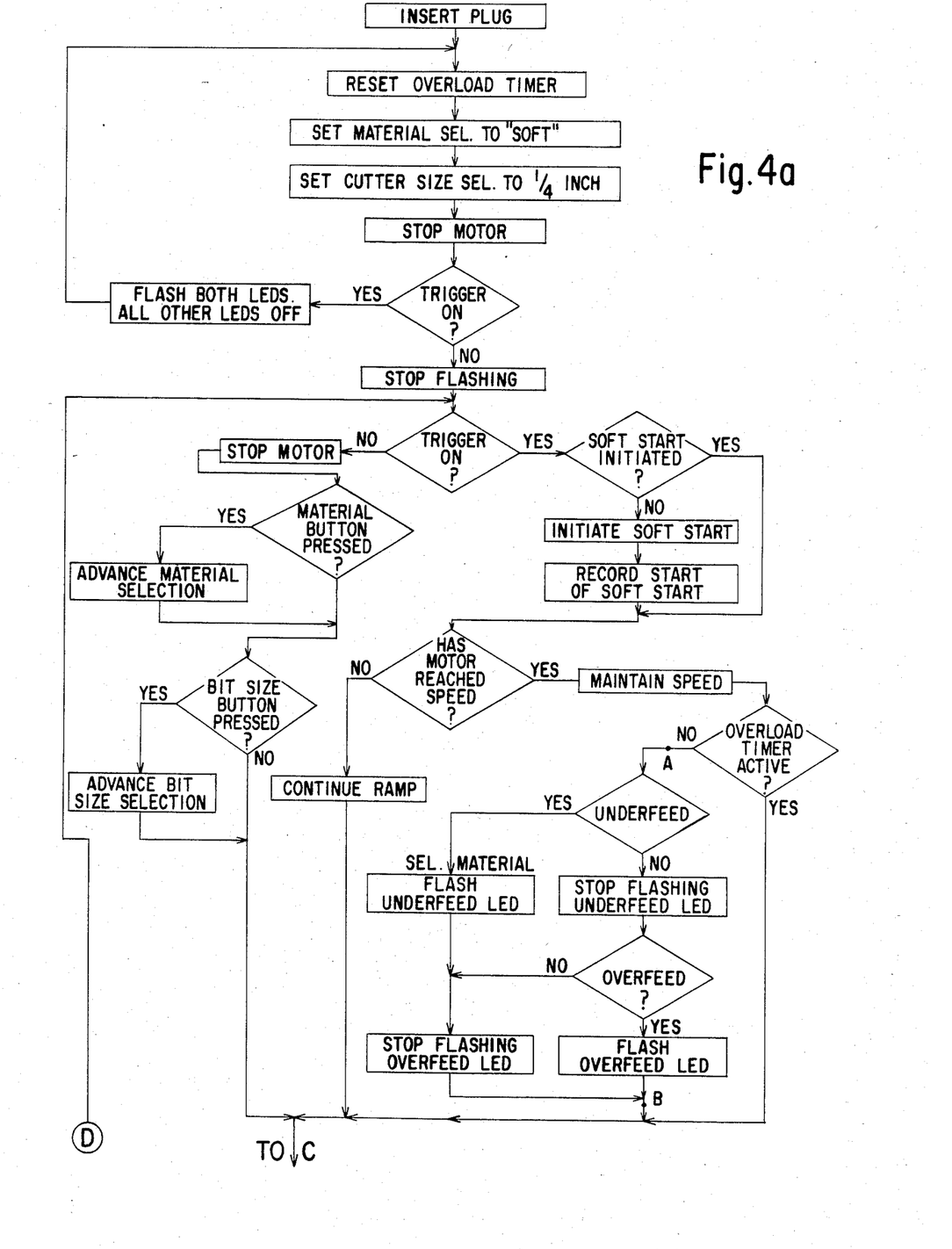
FIGS. 4a and 4b are a flow chart outlining the software for the microcomputer utilized in a preferred embodiment.
Figure 4B:
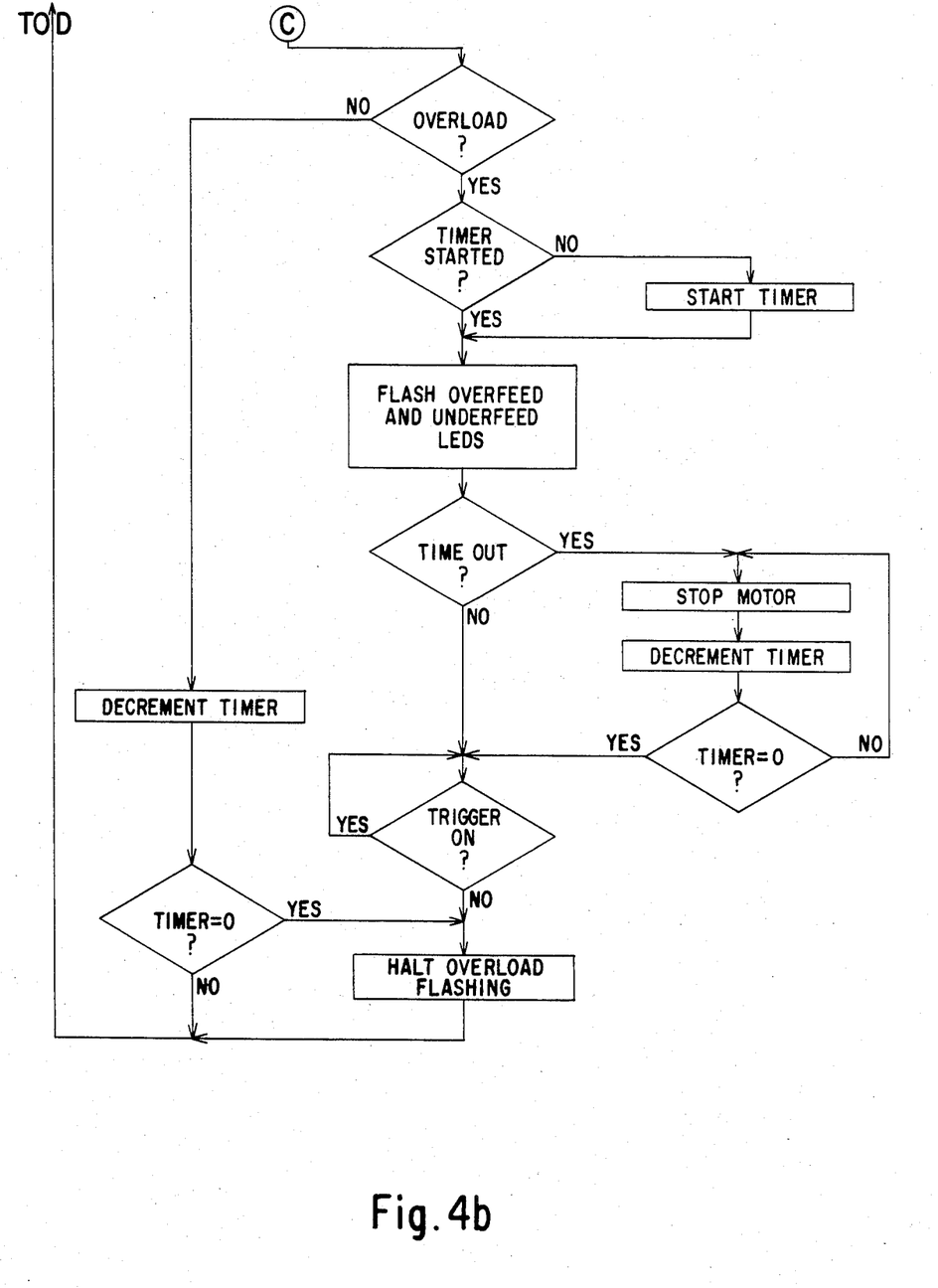

FIG. 4 is a flow chart of the software for the microcomputer 42. After insertion of the plug of the power tool, an overload timer which serves to disconnect the motor after time out of about 5 seconds on a high current overload condition to avoid destructive motor heating, is reset. Material and cutter size are set to the softest material and smallest size. Thereafter a system is implemented to prevent operation of the power tool due to a trigger switch locked in the on position. With the trigger switch 78 in the on position when the plug is inserted, LED's 48 and 54 corresponding to $\frac{1}{4}''$ cutter size selection and soft material selection may flash at some set rate to alert an operator that the tool will not further operate until the trigger switch is shut off. If the trigger switch 78 is not in the on position the microcomputer 42 is ready to receive a material or cutter size selection by scanning from soft to very hard and by scanning from the $\frac{1}{4}''$ cutter size to the $\frac{3}{4}''$ cutter size upon actuation of selector buttons 27, 29, respectively. If the trigger switch 78 is actuated, the motor 74 is ramped up to speed, and once at that speed checks the status of feed rate, that is whether an overload condition exists which has initiated the overload timer or whether an underfeed or overfeed condition exists. If an overload condition exists, this event may be indicated to an operator by simultaneous flashing of both the underfeed and overfeed LED's 52, 53. If an underfeed condition exists the LED 52 in circle 30 is flashed, and if an overfeed condition exists the LED 53 in circle 35 is flashed. Without an underfeed or an overfeed condition, the LEDS 52, 53 will remain unlit. Existence of an overload condition on the motor 74 initiates a timer which will time out in 5 seconds and stop the motor.

Figure 5A:
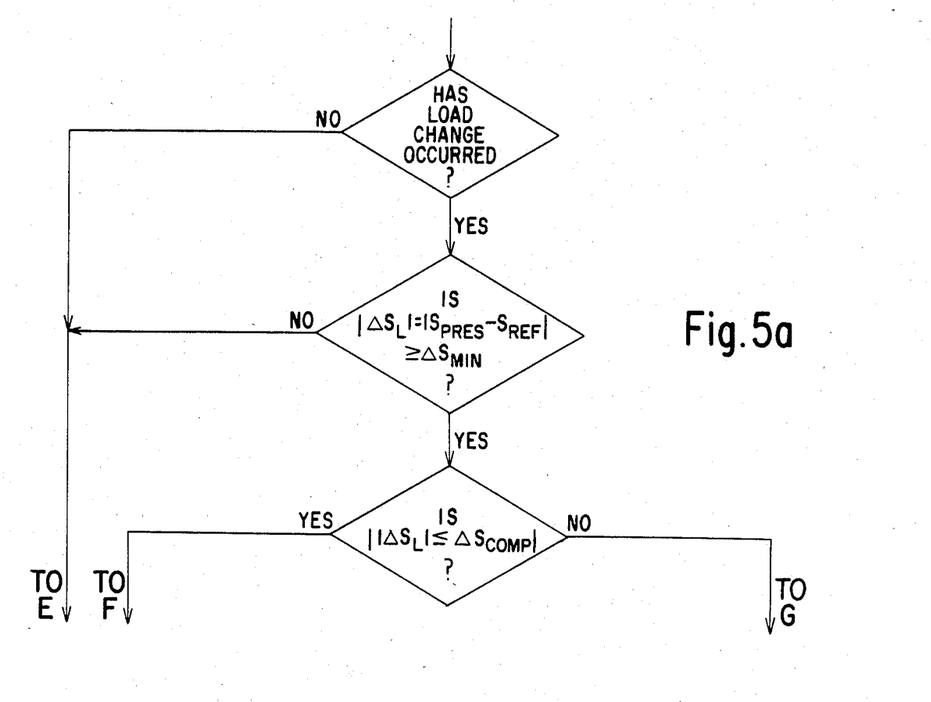
FIGS. 5a and 5b are a detailed flow chart for speed correction corresponding to varying feed rate load.
Figure 5B:
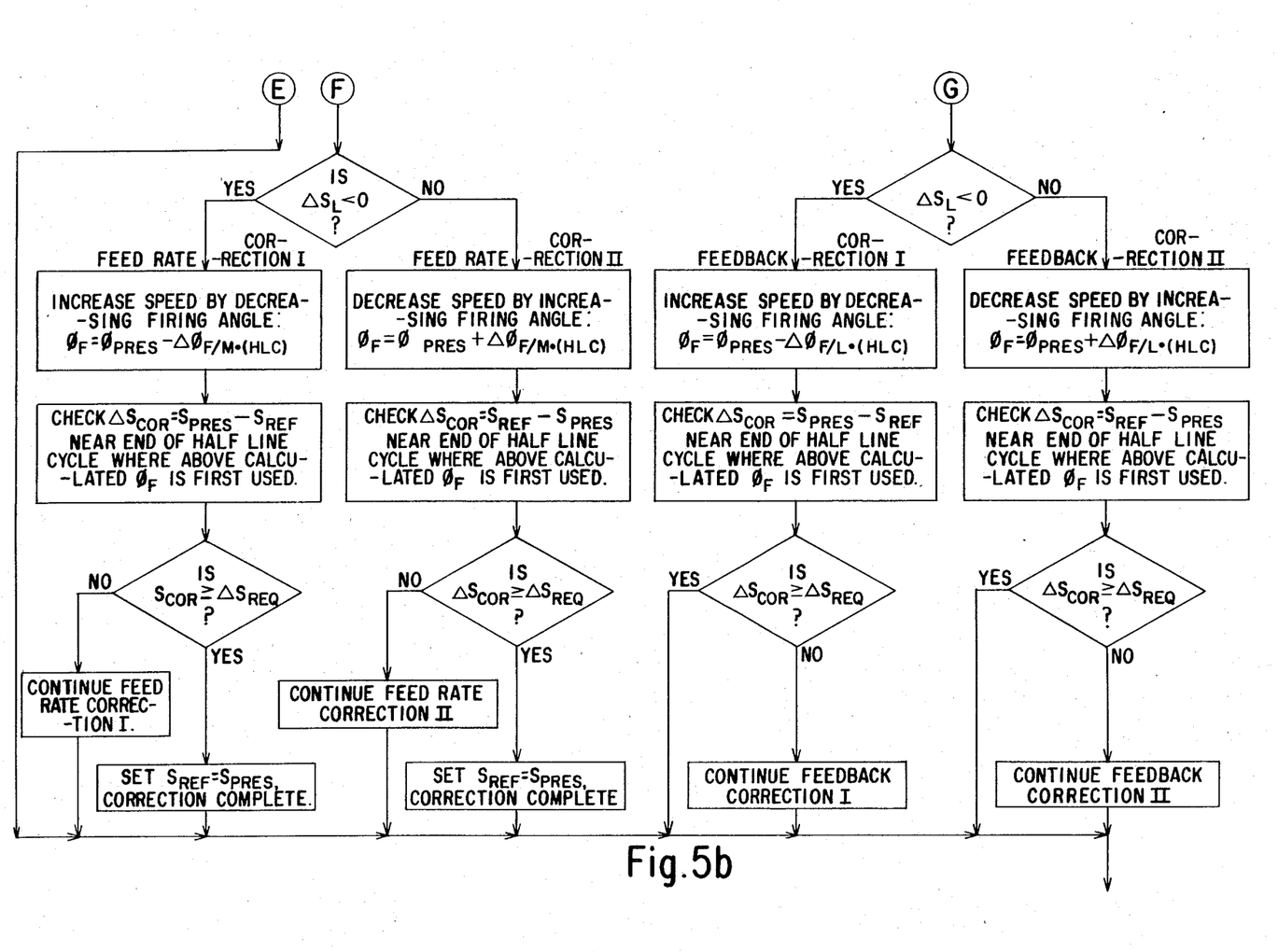
Figure 6:
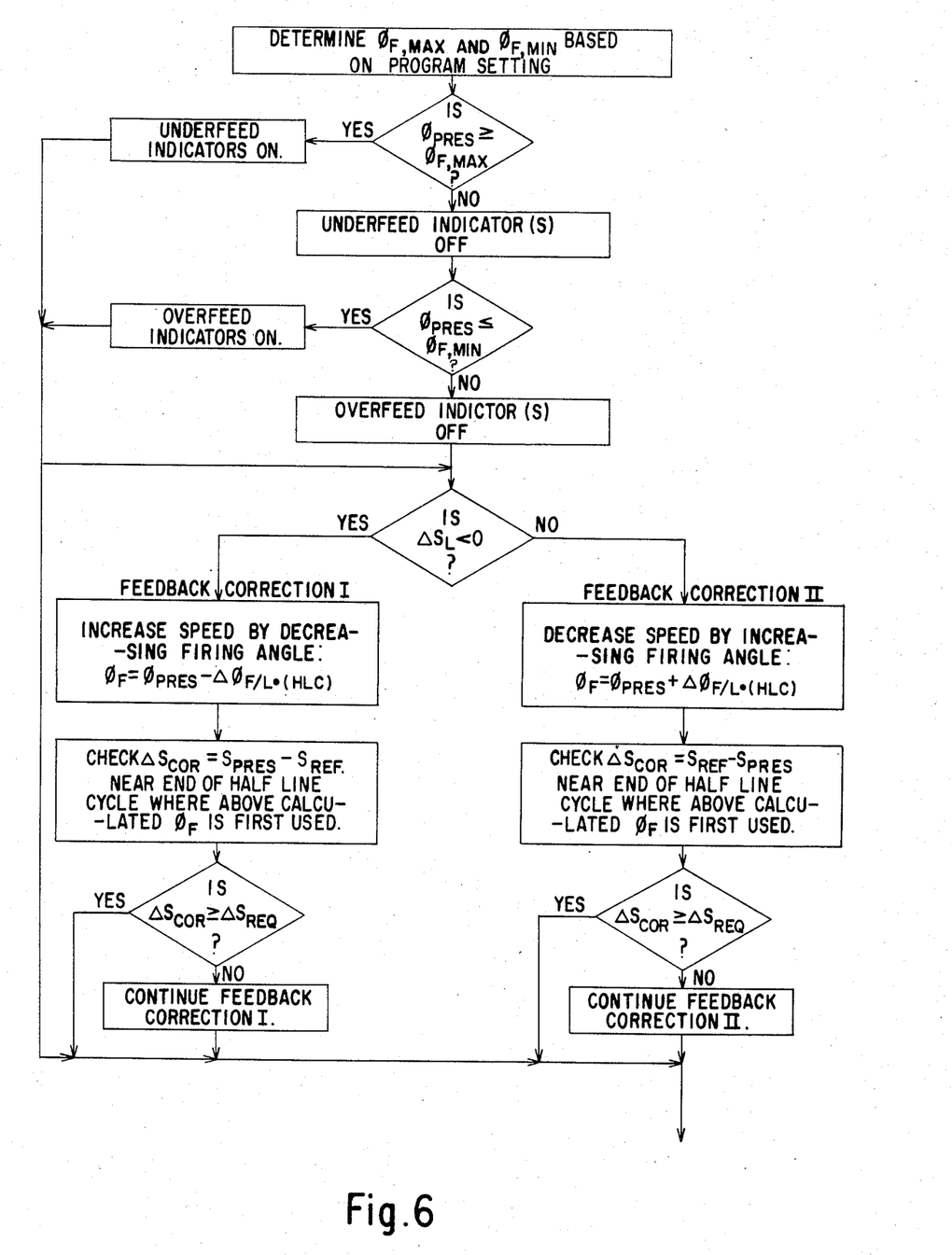
FIG. 6 is a detailed flow chart for detection and indication of over and under feed rate; and, FIG. 7 is a second cutter size-material-speed-load matrix which may be stored in the microcomputer shown in FIG. 2.

FIG. 5 is a detailed flow chart which may be substituted between the points A, B in the flow chart in FIG. 4a in order to obtain a feed rate detection and automatic speed correction therefor. Definitions for the terms used in the flow charts of FIGS. 5 and 6 are found in the Appendix to the specification. Feed rate correction operations are shown in parallel with Feedback correction operations in order to prevent the two operations from interfering with each other by giving simultaneous orders to control the motor, since only one operation can control at a time. The operations are further divided into parallel paths to handle increasing and decreasing speed.

In FIG. 5, it is first determined if a load change has occurred which is significant enough to require a feed rate correction. The third decision box states the necessity for determining if the speed change due to a load change is too large to allow a speed correction through a feed rate correction operation. If so, the feedback operation attempts to correct the speed sufficiently to allow the feed rate operation to take over. This method is used since, for a feed rate speed correction operation, a decreasing load should decrease speed while an increasing load should increase the speed. If not carefully controlled by a feedback operation, the increasing load could allow the speed to run away.

It should be noted that once a speed correction under the feed rate operation is achieved, the latest speed becomes the reference speed to help to keep future speed corrections at a minimum. This allows the feedback operation to regulate to the new speed-feed location rather than attempting to pull the speed back towards the low load speed, which would be a lower speed.

It should be noted that in all paths of feed rate correction or feedback correction, motor speed changes are achieved through adding or subtracting a small firing angle change $[\Delta\phi_{F/(A)\times(HLC)}]$ from the present firing angle $[\phi_{PRES}]$. This method allows a great deal of flexibility with precise control. The subscript "F/(A)×(HLC)" refers to firing per multiples of each half line cycle (HLC). Thus, if (A) were set at 5, a change in firing angle would occur every fifth line cycle until the appropriate speed change was achieved. It is likely that the integer multiplier will be 1 for feedback, particularly for increasing loads, and 1 or a little higher (2 or 3) for feed rate and program speed changes. Different multipliers might be desired for increasing and decreasing loads for the same operation. Above the resolution limit of the control, the basic change in firing angle which could be used for different amounts of phase angle, and consequently speed, changes within each half line cycle. The various constants such as the range of no load program speeds covering all program settings, constant multipliers and upper and lower speed, firing angle, and current limits as needed are stored in the permanent memory of the microcomputer 42. These various constants may be determined through motor analysis and/or empirically through tests of prototype products. In FIG. 7, there is shown a exemplary table of optimum speed for various materials and cutting implement sizes at various loadings of operator imposed feed rate. The speed-feed (or loading) relationship may be determined empirically as providing a good surface finish for the cutting implement size selected and material selected to be operated on.

In FIG. 6, there is provided a suggested detail flow chart for insertion between points A and B of FIG. 4a indicating in detail how overfeed and underfeed indication may be implemented and how feedback correction may also be implemented. Since feed rate does not interact with motor operation, it is placed in series with the feedback operation. Since the feedback will regulate the speed fairly closely with respect to the program no load or reference speed, it is only necessary to determine the upper and lower firing angles which are the limits for acceptable feed rate change. Below the minimum firing angle (a fast feed rate) the overfeed is activated and above the maximum firing angle the underfeed is activated. For feedback control an initial decision is made as to whether the speed is below or above the reference speed; and the firing angle for the triac 70 is increased for below speed, and decreased for above speed.

While the preferred embodiment has been disclosed in the above description, as well as certain modifications thereto, it will be understood that many more modifications may be made without departing from the scope of the invention. For example, it will be apparent that for certain power tools which are dedicated to a limited use as to material and cutter size, no such selection would be required and indication of an optimum feed condition may be provided. Material selection only may be provided based on a limited use as to cutter size, and conversely, cutter size selection only may be provided based on a limited use as to material selection, with an indication of an optimum feed condition provided in either event. Feed rate may be the rate at which a material is fed through a bench tool, or the rate at which a power tool moves with respect to the material. In other words, it is a relative rate between the power tool and the material. In a sanding power tool, hand held or bench, the pressure exerted between the material and the tool becomes a part of feed rate together with speed of the sanding belt or pad, all of which determines how fast material will be removed for a given material and grit size and type. All of these factors are referable to power demands made upon a drive motor, and their relationship to power may be empirically determined and stored in a memory in the power tool. The scope of the invention is set forth in the claims below.

APPENDIX $S_{REF}$—Reference speed against which motor speed is compared to determine whether a speed correction is required and what speed correction mode is required.

$S_{PRES}$—Current motor speed.

$\phi_F$—Firing angle, angle of sine wave alternating current at which electronic power switch (triac) is activated to control motor voltage and thereby speed.

$\phi_{PRES}$—Current firing angle $\Delta\phi_{F/(L)\times(HLC)}$—Change in firing angle which occurs at integer multiples (L or M) of each half line cycle (HLC).

L,M—Constant multipliers dependent on product function and motor characteristics.

$\Delta S_L$—Change in speed from SREF due to load change.

$\Delta S_{MIN}$—Speed change below which no correction is required.

$\Delta S_{COMP}$—Comparison speed change to determine whether feed rate or feedback correction will operate.

$\Delta S_{COR}$—Change in motor speed relative to reference speed.

$\Delta S_{REQ}$—Change in motor speed required to correct for current conditions.

We claim:

1. A power tool for operating on a work material in which the feeding rate between the work material and the power tool is imposed by the direct muscular effort of an operator, said power tool having a frame supporting a motor, and a cutting implement driven by said motor, said power tool comprising:
   (a) selecting means for selecting a work material to be operated upon;
   (b) regulating means including memory means supported in said frame and responsive to a selected material for regulating speed of said motor to an optimum speed for said selected material from a first table of a first speed for various materials stored in said memory; and,
   (c) responding means including said regulating means for responding to an operator imposed feed condition in which the loading imposed by the operator exceeds a preferred loading for operation of said power tool at said first speed, by increasing the speed of said cutting implement according to a second table of optimum speeds for various materials at various loadings stored in said memory of said regulating means.

2. A power tool for operating on a work material in which the feeding rate between the work material and the power tool is imposed by the direct muscular effort of an operator, said power tool having a frame supporting a motor, and a cutting implement driven by said motor, said power tool comprising:
   (a) selecting means for selecting a cutting implement size for operation on said work material;
   (b) regulating means including memory means supported in said frame and responsive to a selected cutting implement size for regulating speed of said motor to an optimum speed for selected cutting implement size from a first table of a first speed for various cutting implement sizes stored in said memory; and,
   (c) responding means including said regulating means for responding to an operator imposed feed condition in which the loading imposed by the operator exceeds a preferred loading for operation of said power tool at said first speed, by increasing the speed of said cutting implement according to a second table of optimum speeds for various cutting implement sizes at various loadings stored in said memory of said regulating means.

3. A power tool for operating on a work material in which the feeding rate between the work material and the power tool is imposed by the direct muscular effort of an operator, said power tool having a frame supporting a motor, and a cutting implement driven by said motor, said power tool comprising:
 (a) selecting means for selecting a work material and cutting implement size;
 (b) regulating means including memory means supported in said frame and responsive to a selected material and cutting implement size for regulating speed of said motor to an optimum speed for said selected material and cutting implement size from a first table of a first speed for various materials and cutting implement sizes stored in said memory; and,
 (c) responding means including said regulating means for responding to an operator imposed feed condition in which the loading imposed by the operator exceeds a preferred loading for operation of said power tool at said first speed, by increasing the speed of said cutting implement according to a second table of optimum speeds for various materials and cutting implements sizes at various loadings stored in said memory of said regulating means.

4. A power tool as claimed in claim 3 wherein said responding means further comprises means for responding to a variation in operator imposed feed condition by varying the speed of said cutting implement according to said second table stored in said memory of said regulating means.

5. A power tool as claimed in claim 4 further comprising:
 means for detecting the speed of said motor; and wherein said means for regulating speed of said motor further comprises;
 a pulse triggered solid state switch,
 said regulating means selectively responding to said speed detecting means to trigger said solid state switch at a firing angle maintaining optimum speed according to said first and second tables, stored in said memory means.

6. A power tool as claimed in claim 5 wherein said regulating means includes a microcomputer programmed to determine if the absolute value of a speed change between the present speed and the optimum speed from said first and second tables for a selected material, cutting implement size and present loadings, exceeds a minimum change prior to initiating a correction to bring said present speed to said optimum speed.

7. A power tool as claimed in claim 6 wherein said microcomputer is further programmed to compare said absolute value of said speed change to a comparison speed change to initiate a speed correction by feedback correction if said absolute value of said speed change exceeds said comparison speed change and to initiate a speed correction by feed rate correction if said absolute value of said speed change is equal to or less than said comparison speed change, wherein for a feedback correction a firing angle change occurs more frequently than for a feed rate correction.

8. A power tool as claimed in claim 7 wherein said microcomputer is further programmed to determine for both feedback correction and feed rate correction if said speed change is less than zero whereupon a speed correction for a present load is implemented by decreasing the present speed by increasing the present firing angle by a firing angle change which occurs in integer multiples of each half line cycle; and if said speed change is less than zero, for both said feedback correction and feed rate correction, increasing the present speed by decreasing the present firing angle by a change in firing angle which occurs in integer multiples of each half line cycle.

* * * * *